United States Patent Office 3,196,875
Patented July 27, 1965

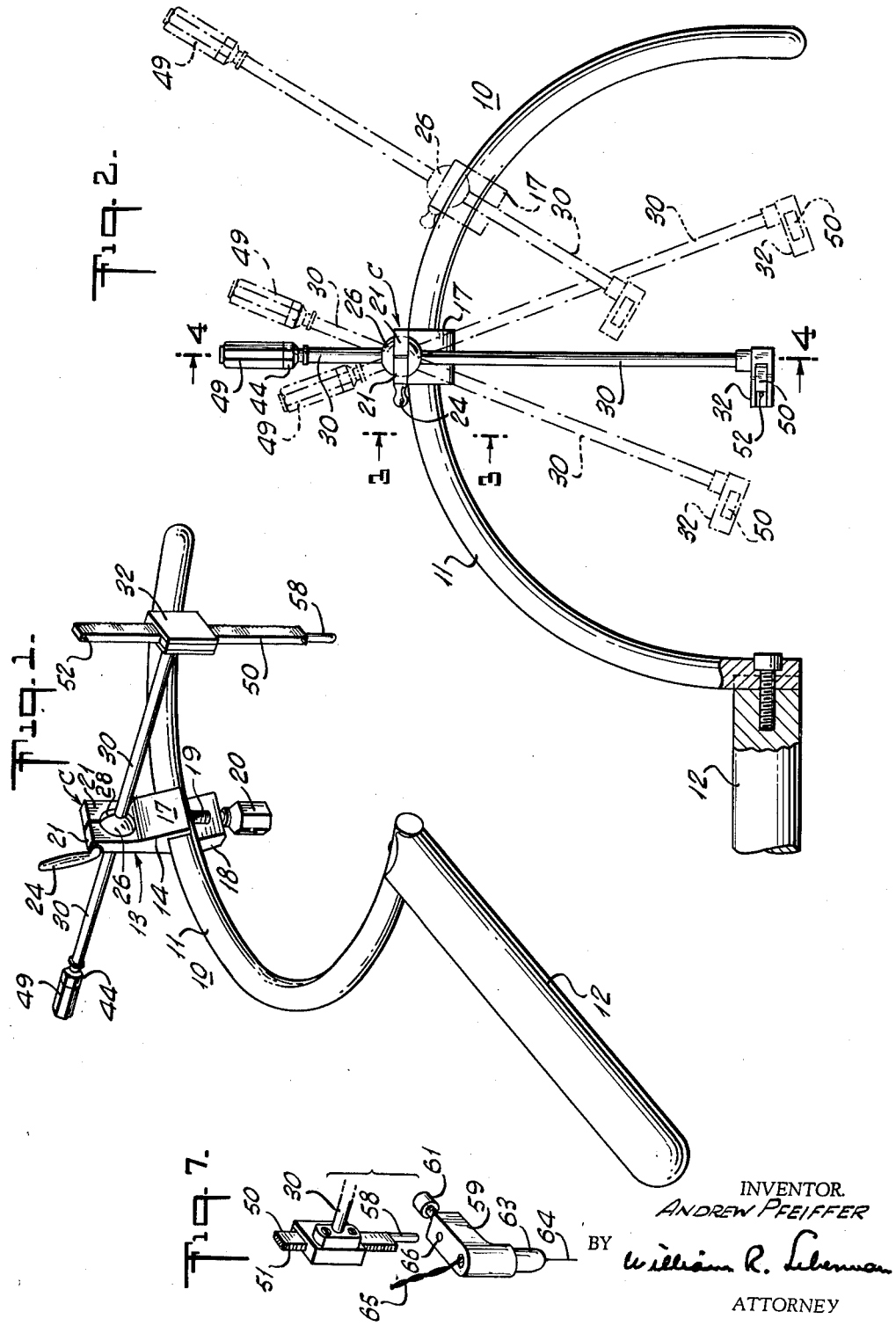

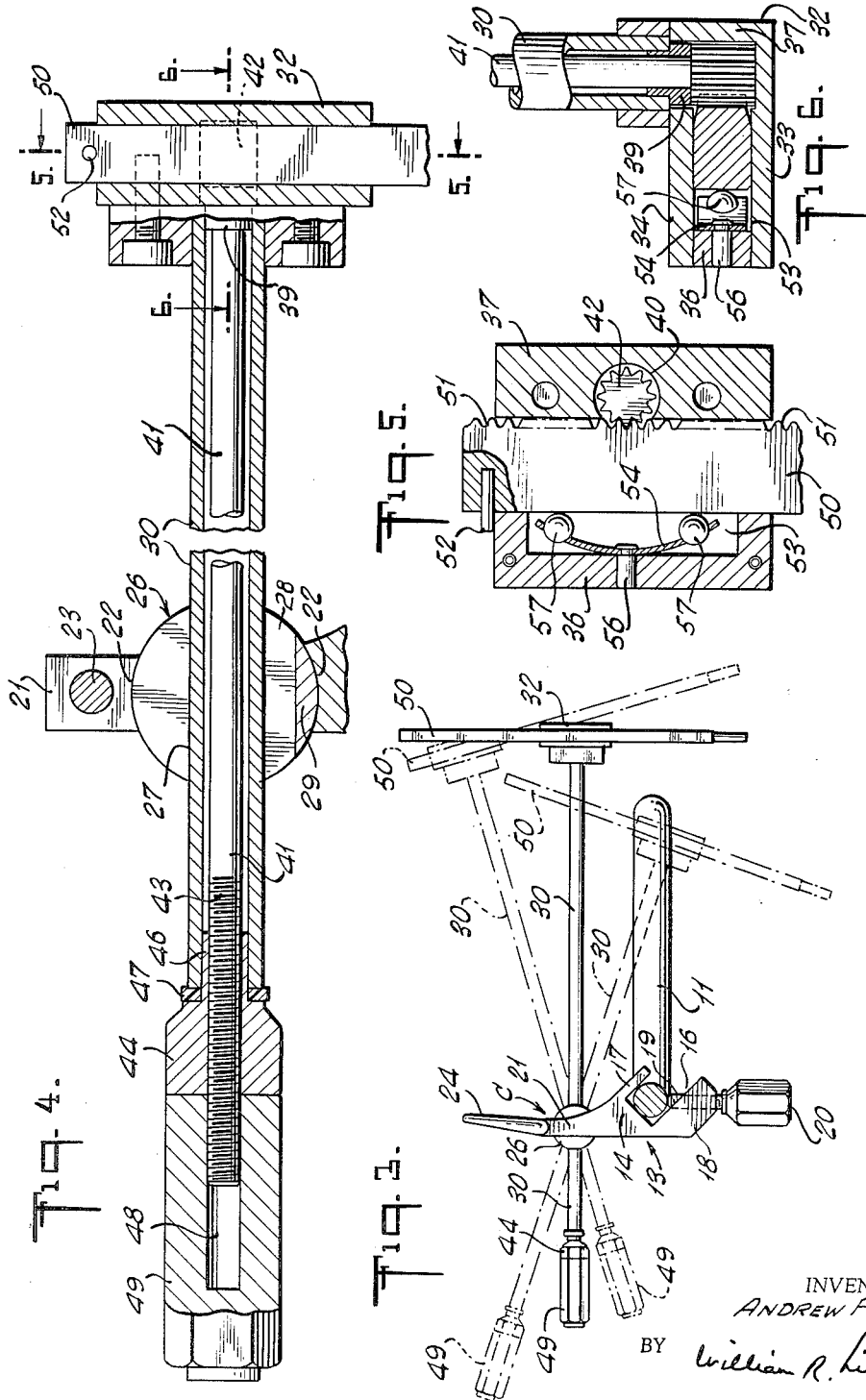

3,196,875
MANIPULATING DEVICE
Andrew Pfeiffer, Box 450, R.F.D. 1, Old Lyme, Conn.
Filed Dec. 10, 1962, Ser. No. 243,482
3 Claims. (Cl. 128—303)

The present invention relates generally to improvements in position adjusting mechanisms, and it relates in particular to an improved micro-manipulating device for effecting fine and precise positioning of an implement or instrument such as an electrode or the like.

Many procedures require universal adjustment of the position of an instrument or implement in a fine and precise manner in the absence of any significant error in manipulation for their effective application. Such procedures are frequently encountered in the medical and biological fields. Thus, in the exploration and diagnostic examination of the brain of an animal or human, it is conventional practice to locate electrodes in electrical contact with predetermined selected areas of the exposed brain. By reason of the irregular configuration of the brain and the visual inability to identify the precise function of each point or area thereof, and wherein even closely spaced points correspond to different functions and responses, it is necessary that the brain exploratory electrode be capable of fine and accurate universal movement in an easy and convenient manner. There must be eliminated the possibility of any mishandling which could result in irreparable damage to the subject or patient. Many devices for the above purposes have been employed and proposed, but these possess numerous drawbacks and disadvantages. They were awkward and bulky devices, with little flexibility, were expensive, and otherwise left much to be desired.

It is, thus, a principal object of the present invention to provide an improved position-control mechanism.

Another object of the present invention is to provide an improved device for the precise and convenient universal adjustment of an implement.

Still another object of the present invention is to provide an improved device for the micro-manipulation of an implement and the releasable locking thereof in any preselected position.

A further object of the present invention is to provide an improved implement-positioning device which may be simultaneously freely universally manipulated with one hand and locked or released with the other hand.

Still a further object of the present invention is to provide a micro-manipulating device of the above nature characterized by its simplicity, compactness and low weight, versatility, reliability and ease of operation.

The above and other objects of the present invention will become apparent from a reading of the following description, taken in conjunction with the accompanying drawings, wherein FIGURE 1 is a front perspective view of an implement-manipulating device constructed according to and embodying the present invention;

FIGURE 2 is a top plan fragmentary view thereof, the adjustable implement-support assembly being illustrated in broken line in various positions;

FIGURE 3 is a sectional view taken along line 3—3 in FIGURE 2;

FIGURE 4 is an enlarged sectional view taken along line 4—4 in FIGURE 2;

FIGURE 5 is a sectional view taken along line 5—5 in FIGURE 4;

FIGURE 6 is a sectional view taken along line 6—6 in FIGURE 4; and

FIGURE 7 is a perspective fragmentary exploded view of the implement support assembly.

In a sense, the present invention contemplates the provision of an implement-manipulating device comprising a compressible ball member having an axial bore formed therein, an implement-supporting rod slidably registering with said axial bore, a compressible socket member having a surface complementing and engaging said ball member, and means for selectively compressing and releasing said socket member respectively to compress and lock said ball member and lock said rod in a preselected position and to release said ball for universal movement in said socket and said rod for axial movement in said bore.

According to a preferred form of the present device, there is provided a curved track element along which a bracket member may be selectively position, the bracket member carrying a clamp provided with jaw members having spherical concavities formed in their confronting faces. A screw member engages the free ends of the jaws selectively to contract and release the jaws. The axially bored ball member registers with the spherical concavities to define therewith a universal ball and socket joint, the ball member being diametrically split along the full length of the bore and from one surface to a point short of the opposite surface so that the ball may be resiliently compressed with the contraction of the jaws. An elongated tube extends through and slidably and rotatably registers with the bore of the ball member and has mounted at its inner end a bracket which slidably supports a tool-carrying rack. A rod axially registers with the tube and has affixed a rear engaging rack to its inner end and carries a knob at its outer end.

Referring now to the drawings, which illustrate a preferred embodiment of the present invention, reference numeral 10 generally designates the improved device which includes a semi-circular track member 11 terminating in an outwardly projecting support bar 12. Support bar 12 may be received by a suitable mounting bracket to permit the desirable positioning of the track, as for instance, on the head of a patient with which device 10 is to be employed.

A clamp member 13 is formed of a somewhat resilient material, for example aluminum, and slidably engages track 11. Clamp 13 includes a lower laterally extending carriage section 14 having formed in its inner face a downwardly, inwardly directed rectangular groove 16 which engages the track 11. A leg 17, delineating the upper side of groove 16, and the base of groove 16 rest on track 11, which is of circular cross section, and are tangent thereto. In order to lock clamp 13 releasably in any preselected position along track 11, there is formed in the lower leg 18 of carriage section 14 a vertically tapped bore directed toward the upper corner of the groove 16 and engaged by a clamp screw 19 terminating at its lower end in a knob 20.

Extending upwardly from carriage section 14 is a clamp C defined by a pair of opposing relatively thin jaw members 21 joined at their bases to carriage section 14. Formed in the confronting faces of the jaw members 21 are spherically surfaced concavities 22 which define a coupling socket. Axially aligned bores are forced in jaws 21 above socket 22, one of the bores being tapped and the other being smooth. A lock screw 23 passes freely through the smooth bore and engages the tapped bore and terminates in a finger piece 24 at its free end. Thus, clamp jaws 21 may be contracted, or released to expand by slight movement of screws 23 by rotation of finger piece 24 in one direction or the other.

A compressible ball member 26 rotatably registers with socket 22, has a surface complementary thereto, and is formed of a resilient material such as bronze or the like. Ball 26 has an axial bore 27 formed therethrough and is partially slit along a medial plane by a slot 28 extending parallel to and for the full length of bore 27 and extends from the upper surface of the ball 26 to a line short of the bottom thereof to leave a hinge section 29. Contraction of jaws 21 correspondingly contracts the ball halves separated by slot 28 to compress axial bore 27.

An elongated tubular member 30 slidably and rotatably registers with bore 27 when the latter is in its normal expanded condition and has mounted on its inner end a rack support bracket 32. Bracket 32 comprises a rectangular tubular housing delineated by front and rear walls 33 and 34 and side walls 36 and 37 respectively, and having vertically aligned rectangular openings formed in the top and bottom thereof. Support tube 30 is suitably joined to housing side wall 37 at the rear face thereof and communicated through a bushing 39 with a cylindrical well 40 formed in the wide wall 37 coaxial with the tube 30. A rod or shaft 41 of smaller diameter than the inside diameter of the tube 30 extends coaxially along the length thereof and projects through the bushing 39. A pinion gear 42 nesting in well 40 is affixed to the end of shaft 41 and projects beyond the inner face of wall 37.

The outer end of shaft 41 is threaded as at 43 and projects beyond the outer end of tube 30. A first knob section 44 provided with a forwardly projecting sleeve 46 rotatably nesting in the trailing end of the tube 30 has an axially tapped bore formed therein which engages the shaft threaded section 43 and is spaced from the end of the tube 30 by a washer 47. The threaded shaft section 43 extends rearwardly of the knob section 44 and is engaged by an axially tapped bore 48 formed in a rear knob section 49 which is screwed onto shaft section 43 to bring the confronting faces of knob sections 44 and 49 into tight abutment and thereby lock them to shaft 41.

Slidably registering with the vertical bore in bracket 32 is a rack member 50 having teeth 51 engaging gear 42 and carrying a laterally projecting abutment pin 52 at its upper end to limit downward movement thereof. A well 53 is formed in the inside face of side wall 36 confronting the rack 50. Housed in well 53 and extending along the length thereof is a bowed spring 54 formed of a resilient metal band and having its crowned face abutting the base of the well 53 and affixed thereto by a suitable fastener 56. Circular openings are formed in the spring 54 adjacent opposite ends thereof and engage ball bearings 57 of slightly larger diameter resiliently to urge ball bearings 57 into rolling contact with the confronting face of rack member 50 opposite teeth 51.

Depending from the bottom of rack 50 is a shank 58. An implement support bracket 59 is provided with a vertical bore 60 which engages shank 58 and the bracket 59 is releasably locked thereto by a thumb screw 61 engaging a tapped bore communicating with bore 60. Mounted at the free end of bracket 59 and depending therefrom is a chuck 63 of any suitable construction which releasably engages an implement such as a probe electrode 64 which may be connected to suitable instruments by a conductor 65.

In employing the apparatus described above, track 11 is mounted in any suitable fashion above the work area and the manipulating assembly including clamping member 13 is slid along the track 11 to the desired position and locked therein by tightening screw 19. Knob 49 is grasped by one hand and clamp 20 loosened by turning the screw finger piece 24 with the other hand thereby to free support tube 30 for sliding and rotary movement and the ball 26 for universal angular movement. When bracket 32 has been desirably oriented and positioned by the manipulation of knob 39, clamp 20 is tightened by turning finger piece 24 in the proper sense. It should be noted that finger piece 24 requires only a small angular twist between the clamp-open position and clamp-closed position and that, in intermediate positions, different degrees of force are required to manipulate the device. Thereafter, rack 50 may be selectively advanced and retracted by turning knob 49 correspondingly to raise and to lower any implement carried by bracket 59.

While there has been described and illustrated a preferred embodiment of the present invention, it is apparent that numerous alterations, omissions and additions may be made without departing from the spirit thereof.

What is claimed is:

1. An implement-manipulating device comprising a compressible ball member having an axial bore formed therein, an implement supporting tubular member independently slidably and rotatably registering with said axial bore an implement-control rod rotatably registering with and extending axially through said tubular member, a compressible socket member having a surface complementing and engaging said ball member, and means for selectively compressing and releasing said socket member respectively to compress and lock said ball member and lock said tubular member in a preselected position and orientation and to release said ball for universal movement in said socket and said tubular member for rotation and axial movement in said bore, and including a bracket member mounted on the inner end of said tubular member, a rack extending at an angle to said tubular member and slidably supported by said bracket member, a gear affixed to the inner end of said control rod and engaging said rack, and a knob affixed to the outer end of said control rod.

2. The implement-manipulating device of claim 1, including an implement support bracket member on said rack.

3. An implement-manipulating device comprising a compressible ball member having formed therein an axially extending bore and a diametric slot extending for the full length of and lying in the plane of said bore and extending from a surface of said ball member through said bore to a point short of the opposite surface of said ball, a clamp member including jaw members movable between a contracted and expanded position and having spherical concavities formed in opposing faces thereof complementing and engaging said ball member, an implement supporting elongated tubular member extending through and independently slidably and rotatably registering with said axial bore an implement-control rod rotatably registering with and extending axially through said tubular member, and means releasably locking said clamp jaws in a contracted position to compress said ball member and releasably lock said ball member and tubular member in preselected positions and orientations, including a bracket mounted on the inner end of said tubular member, a rack member slidably supported by said bracket, a gear affixed to the inner end of said control rod and engaging said rack member, an implement holder mounted on said rack member and a knob located at the outer end of said control rod.

References Cited by the Examiner

UNITED STATES PATENTS

| 1,574,899 | 3/26 | Kellogg | 287—88 X |
| 1,775,525 | 9/30 | Hedlund | 287—88 |
| 2,250,417 | 7/41 | Ettinger | 128—84 |
| 2,333,033 | 10/43 | Mraz | 128—92 |
| 2,393,982 | 2/46 | Giesen | 128—84 |
| 2,697,433 | 12/54 | Zehnder | 128—83 |
| 3,017,887 | 1/62 | Heyer | 128—303 |
| 3,053,256 | 9/62 | Cooper et al. | 128—303 |
| 3,061,936 | 11/62 | Dobbeleer | 128—303 |

FOREIGN PATENTS

| 286,627 | 12/28 | Great Britain. |
| 869,842 | 3/53 | Germany. |
| 975,238 | 10/50 | France. |

RICHARD A. GAUDET, *Primary Examiner.*

JORDAN FRANKLIN, *Examiner.*